Patented Jan. 4, 1944

2,338,259

UNITED STATES PATENT OFFICE 2,338,259

MUSHROOM SPAWN AND SUBSTRATE THEREFOR

Granville Raymond Rettew, West Chester, Pa., assignor to Chester County Mushroom Laboratories, West Chester, Pa., a corporation of Pennsylvania No Drawing. Application December 29, 1942, Serial No. 470,508

6 Claims. (Cl. 71—5)

This invention relates to mushroom spawn and to subtrate or culture medium therefor, and is also concerned with improved methods of manufacturing such spawn and substrate.

The old and still widely practiced method of preparing mushroom spawn involves the use of horse manure as an ingredient of the subtrate or culture medium. As is well known, horse manure necessitates frequent turning over during a period of some three weeks before it attains the proper physical and chemical consistency and is free of fecal odor, and moreover requires considerable storage space for its accommodation while aging.

In the more recent method disclosed in Patent No. 1,869,517, which was granted to James W. Sinden on August 2, 1932, the preparation of the substrate or culture medium for mushroom spawn is made up from cereals like hominy, cracked wheat, whole grain wheat, barely or rye, and calcium carbonate. This patented method entails frequent shaking or agitation of the cultures during incubation.

In still another new method disclosed in my U. S. Patent No. 1,939,600 dated December 12, 1933, the substrate or culture medium is composed of a mixture of divided or ground tobacco stems, humus, and an alkaline material. Such substrate can be easily broken up after inoculation and incubation into small fragments for efficient sowing and has some insecticidal value, but adhesion does not take place between the humus and the tobacco stem particles, so that the resultant base for the growth of the mycelium lacks compactness.

The chief aim of my present invention is to overcome the various drawbacks and deficiencies above pointed out in connection with prior art methods of mushroom spawn culture manufacture, and at the same time make possible the production of a substrate which favors more rapid and vigorous development of the mycelium.

This desideratum is realized in practice as hereinafter more fully set forth by utilizing as one of the ingredients for the substrate or culture medium, small starch-bearing seeds such as Kafir-corn having a relatively heavy coat; and by treating the seeds in such a way that they are split for free excretion of the starchy endosperm from within them, to which latter other ingredients of said substrate or culture medium will readily cling to form a relatively heavy and highly nutritious receptive base coating around each seed wherein the mycelium will readily and rapidly develop during incubation.

Other objects and attendant advantages of my invention will appear from the detailed description which immediately follows.

In carrying out my invention, quantities of the starch-bearing seeds are placed in suitable containers such as galvanized tubs, and to each batch water is added to about double the depth of the seeds. The tubs thus charged with the seeds and the water are then placed in a suitable sterilizer and therein treated for approximately an hour at a temperature of about 250° F. As a consequence of this treatment, the seeds are swelled and cracked with the starchy endosperm oozing from within them. At the expiration of the treating period, the tubs are removed from the sterilizer, and the swelled seeds while still hot and moist, thoroughly comingled with an appropriately proportioned mixture of humus and lime-bearing material, such for example as comminuted limestone, during the latter treatment. This mixture of humus and lime material is absorbed by the starchy endosperm surrounding the swelled seeds, with attendant formation of small round balls of which said seeds form the nuclei having relatively thick jackets or coatings of said mixture. The coarse ground limestone promotes cohesion as between the humus and the seeds, improves the consistency, and adjusts the reaction approximately within the range of pH 7.8 to pH 6.8.

After adjusting the moisture in the culture medium thus prepared to the proper amount for spawn growing, small quantities of the medium are placed in suitable containers or jars preferably of the kind disclosed in my U. S. Patent No. 1,914,353, dated June 13, 1933, and the charges in the jars are then inoculated and incubated in the manner usually followed in the manufacture of ordinary manure spawn. In other words, a hole is bored in each such charge and small fragments of culture or "original" of carefully prepared germinated mushroom spores placed within the hole at the bottom thereof and near the top. Each jar is thereupon sealed by inserting a plug of cotton wool in the open end or mouth thereof, surgical precautions being exercised in these latter steps to insure against contamination by foreign organisms. Finally the jars with their inoculated charges are placed in a suitable incubating chamber maintained at a temperature of about 70° F., and kept in said chamber for twenty-one days or so to allow complete growth of the mushroom mycelium through the fertile coating applied to the seeds as above explained. Actually the mycelium develops as a thick, dense and vigorous growth in the layer of humus-limestone mixture clinging to the seeds, except in that portion of the layer which is buried deep around the seeds.

During incubation, the nutrient substance continues to ooze out of the seeds and adds to the nourishment of the constantly growing mycelium in the surrounding layer of the fertile humus-lime mixture.

In practice the following formula has given very excellent results:

| | Pounds |
|---|---|
| Humus | 120 |
| Kafir-corn | 100 |
| Coarse ground limestone | 70 |

Water added to furnish moisture between 60% and 70% on a wet-weight basis.

The word "humus" as herein used is to be understood to consist of a complex aggregate of brown to dark colored amorphous substances which have originated during the decomposition of plant and animal residues by micro-organisms under aerobic or anaerobic conditions, usually in soils, composts, peat bogs and water basins.

While, as above pointed out, Kafir-corn seeds lend themselves very satisfactorily to use and treatment according to my invention, other seeds such as wheat, rye and barley, and other corns, e. g. pop corn, broom corn, sorghum, etc., having a fairly heavy seed coating and containing a starchy endosperm, may be substituted with attainment of equally favorable results.

Other lime-bearing materials can of course be employed if desired or found more convenient, in lieu of limestone, providing that the proper proportions of them are used.

Having thus described my invention, I claim:

1. A substrate for mushroom spawn consisting of a mass of granular material whereof the granules are composed of starch-bearing seeds which have been split and sterilized by treatment with hot liquid, and each of which is surrounded by a relatively thick coating of humus material held by starchy endosperm excretion from such seed.

2. A substrate for mushroom spawn consisting of a mass of granular material whereof the granules are composed of starch-bearing seeds which have been split and sterilized by treatment with hot liquid, and each of which is surrounded by a relatively thick coating of lime and humus material held by starchy endosperm excretion from such seed.

3. The method of manufacturing substrate or culture medium for mushroom spawn, which comprises soaking relatively small starch-bearing seeds having a heavy seed coat, in water; subjecting the soaked seeds to a relatively high sterilizing temperature until they have swelled and cracked open with the starchy endosperm oozing therefrom; removing the swelled seeds from the water; and then treating the swelled seeds while still hot, with humus material suitable for mycelium development until a thick coat of such material is absorbed by and clings to the starchy endosperm excretion.

4. The method of manufacturing substrate or culture medium for mushroom spawn, which comprises soaking relatively small starch-bearing seeds having a heavy seed coat, in water; subjecting the soaked seeds to a sterilizing temperature of approximately 250° F. until they have swelled and cracked open with the starchy endosperm oozing therefrom; removing the swelled seeds from the water; and then thoroughly treating the swelled seeds while still hot, with humus material suitable for mycelium development until a thick coat of such material is absorbed by and clings to the starchy endosperm excretion.

5. The method of manufacturing substrate or culture medium for mushroom spawn, which comprises soaking relatively small starch-bearing seeds having a heavy seed coat, in water; subjecting the soaked seeds to a relatively high sterilizing temperature until the seeds have swelled and cracked open with the starchy endosperm oozing therefrom; removing the swelled seeds from the water; and then treating the swelled seeds while still hot, with a mixture of humus and a lime-bearing material until a thick coat of the mixture is absorbed in and clings to the starchy endosperm excretion.

6. The method of manufacturing substrate or culture medium for mushroom spawn, which comprises soaking relatively small starch-bearing seeds having a heavy seed coat, in water; subjecting the soaked seeds to a sterilizing temperature of approximately 250° F. until the seeds have swelled and cracked open with the starchy endosperm oozing therefrom; removing the swelled seeds from the water; and then thoroughly treating the swelled seeds while still hot, with a mixture of humus and a lime-bearing material until a thick coat of the mixture is absorbed in and clings to the starchy endosperm excretion.

GRANVILLE RAYMOND RETTEW.